United States Patent [19]

Swinderman

[11] Patent Number: 4,643,293
[45] Date of Patent: * Feb. 17, 1987

[54] CONVEYOR BELT CLEANER

[75] Inventor: Robert T. Swinderman, Kewanee, Ill.

[73] Assignee: Martin Engineering Company, Neponset, Ill.

[*] Notice: The portion of the term of this patent subsequent to Jul. 8, 2003 has been disclaimed.

[21] Appl. No.: 830,275

[22] Filed: Feb. 18, 1986

Related U.S. Application Data

[62] Division of Ser. No. 579,707, Feb. 13, 1984, Pat. No. 4,598,823.

[51] Int. Cl.$^4$ .............................................. B65G 45/00
[52] U.S. Cl. ..................................................... 198/497
[58] Field of Search .................. 198/497, 499; 15/245, 15/256.5

[56] References Cited

U.S. PATENT DOCUMENTS

| | | | |
|---|---|---|---|
| 3,342,312 | 9/1967 | Reiter | 198/499 |
| 3,656,610 | 4/1972 | McWilliams | 198/499 |
| 3,674,131 | 7/1972 | Matson | 198/497 X |
| 4,202,437 | 5/1980 | Gordon | 198/497 |
| 4,355,432 | 10/1982 | Storm, Jr. | 15/245 |
| 4,359,150 | 11/1982 | Bowman et al. | 198/497 |

Primary Examiner—Joseph E. Valenza
Assistant Examiner—D. Glenn Dayoan
Attorney, Agent, or Firm—Mann, McWilliams, Zummer & Sweeney

[57] ABSTRACT

A conveyor belt cleaning arrangement consisting of a transversely disposed support which includes a plurality of connector slots. One or more elastomeric cleaner blades, either of the arm and blade type, include a locking means to releasably connect the blade to the support without the use of fasteners and secure the blade against lateral motion and hold the blade in position for cleaning the belt.

7 Claims, 7 Drawing Figures

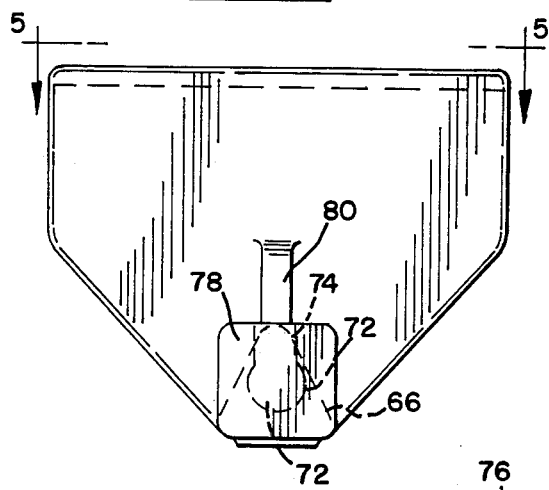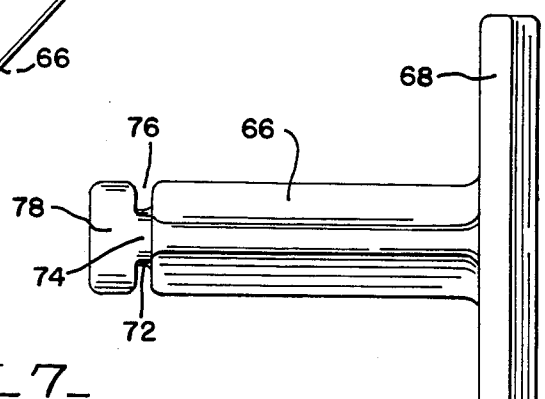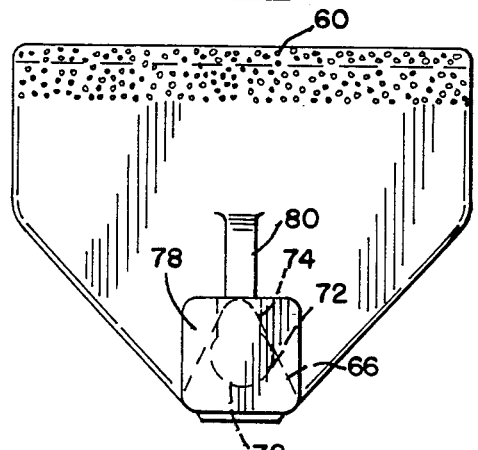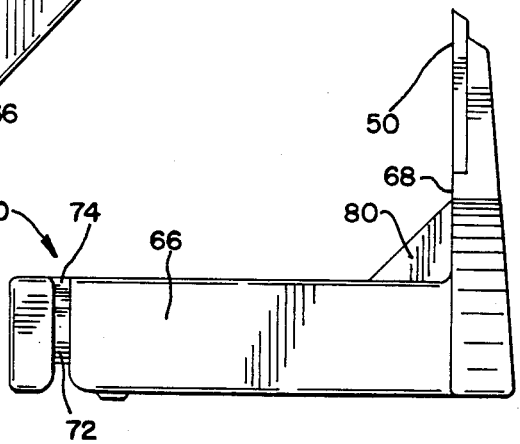

CONVEYOR BELT CLEANER

This application is a division of application Ser. No. 579,707, filed Feb. 13, 1984 now U.S. Pat. No. 4,598,823.

BACKGROUND OF THE INVENTION

It has been known in the art to provide conveyor belt cleaners in which a transversely disposed cross-shaft provides a support for individually mounted belt cleaner blades of either the doctor blade or arm and blade type. Generally the blades are mounted by means of fasteners to mounting members disposed on the cross-shafts. When the blades wear beyond certain limits, the fasteners are removed and the blades are replaced. This type arrangement is shown in U.S. Pat. Nos. 4,098,394, 3,598,231, 2,794,540, 1,975,591, 3,504,780, and 3,342,312.

Other arrangements have attempted to provide for removal and replacement of cleaner blades without the use of fasteners. Some examples are shown in U.S. Pat. Nos. 3,999,649, 4,131,194, 4,202,437, and 4,265,358.

Still others have recognized the advantages of a belt cleaner arrangement in which the arm and blade are formed as an integral unit, as shown in U.S. Pat. Nos. 897,955 and 2,227,776.

Other arrangements of interest are shown in U.S. Pat. Nos. 4,328,888, 3,913,728, and 3,952,863.

None of the prior art, however, discloses a belt cleaner arrangement which provides the advantages of the present device.

SUMMARY OF THE INVENTION

In the arm and blade embodiment of the present invention, the arm and the blade are integrally formed as a single unit of a resilient, elastomeric material. A snap fit connector is provided at the end of the arm opposite the blade to secure the unit to the support. Such an arrangement allows the blade to rotate about the central axis of the arm to give better alignment with the belt. Due to the resilience of the arm and blade, the pressure applied by rotation of the transverse support can cause the angle of the blade with respect to the belt to the incrementally adjusted with the ability to go from a negative angle to a positive angle depending upon the particular circumstances of the environmental conditions.

DESCRIPTION OF THE DRAWINGS

FIG. 4 is a rear view of the arm and blade embodiment of the present invention.

FIG. 5 is a top view of the arm and blade member taken along the lines 5—5 of FIG. 4.

FIG. 6 is a side view of an alternative embodiment of the present invention.

FIG. 7 is a rear view of an alternative embodiment of the present invention.

DESCRIPTION OF THE PREFERRED EMBODIMENT

Figure 1:
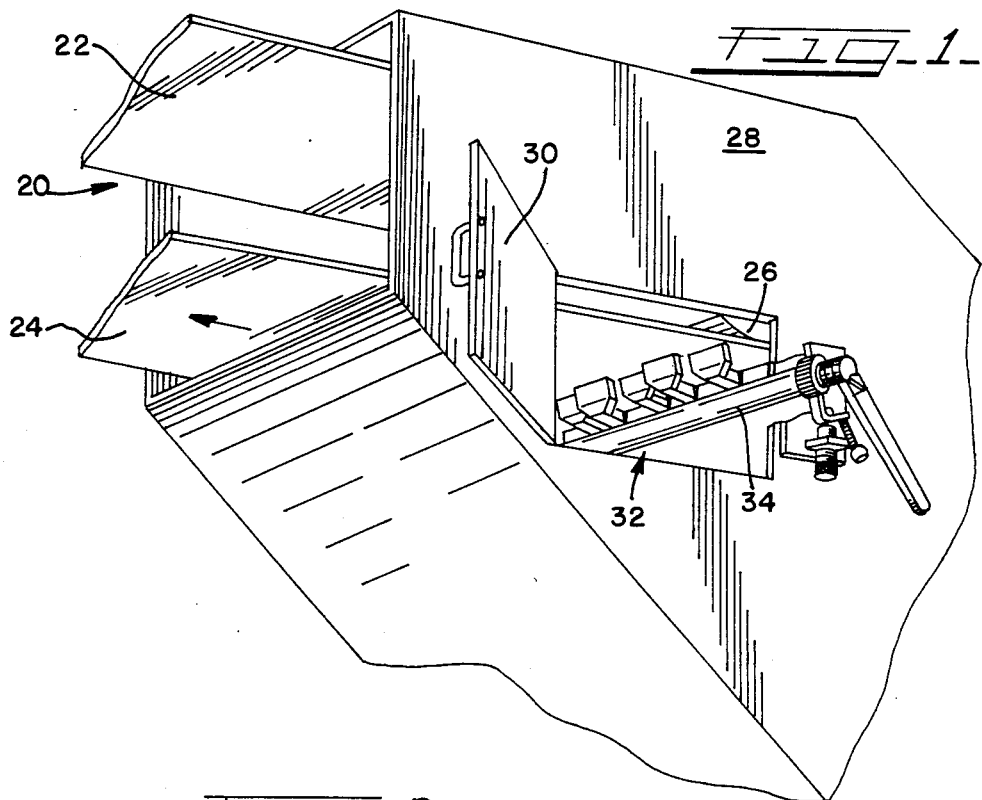
FIG. 1 is a perspective view showing the belt cleaning arrangement in operation.

FIG. 1 shows, in perspective, the discharge end portion of a typical conveyor belt 20 having an upper or delivery run 22 and a lower or return run 24, the belt being trained about a drum or roller 26 conventionally carried in a frame (not shown) within a housing 28. The housing is provided with an access door 30 which allows the operator to inspect the belt cleaning operation.

Figure 2:
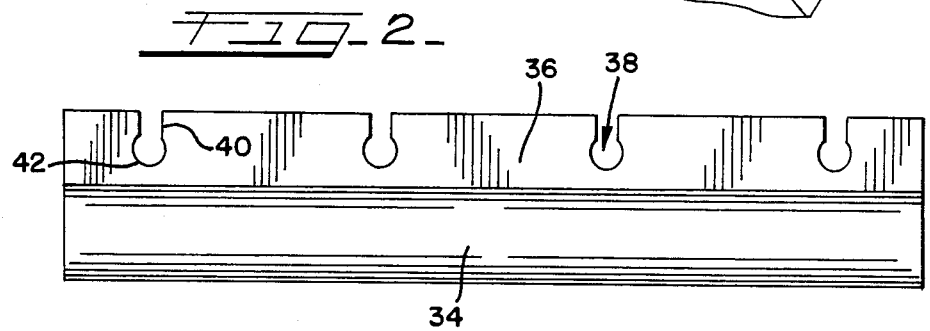
FIG. 2 is a front view of the transverse support member with the cleaner blades removed.

A belt cleaner assembly 32 is provided consisting of a support 34 which is disposed below and substantially transverse to the direction of travel of the return run 24, as indicated by the arrow. Although FIGS. 1 and 2 illustrate the support 34 as being a circular shaft, any of a number of commonly used support members could be substituted for the circular shaft and operate within the scope of the present invention. Carried on the shaft 34 is a radially upstanding flange 36 which defines a plurality of connector apertures 38, the purpose for which will become apparent. If a flat bar or plate were used as a support member, no flange would be necessary. The apertures 38 would be formed directly into the bar. The apertures 38 include a slot section 40 and at the lower end a generally circular section 42. The arrangement of the cross-shaft 34, flange 36, and connectors 38 are best shown in FIG. 2. Although the aperture 38 is illustrated generally in the form of a keyhole, any of a number of connector apertures of different shape could be substituted to achieve the same result.

Metallic or non-metallic elements can be embedded into the cleaning portion of the blade, as well as attached to the face, in the arm and blade embodiment. One example would be ceramic beads 60 embedded into the edge, as shown in FIG. 7, or a tungsten carbide element 50 affixed against the face as shown in FIG. 6.

The arm and blade embodiment of the present invention is disclosed in FIGS. 3 through 7. This embodiment includes an arm 66, shown as triangular in cross-section, integrally formed with a blade 68, both the arm and the blade being formed of elastomeric materials. Acceptable results have been achieved when both the arm and blade are molded of the same 90 durometer urethane, but it is also within the scope of the present invention to mold the unit as an integral part in which the arm 66 comsists of 60 durometer urethane, the blade 68 of 90 durometer urethane, and the fastening area between the arm and blade of 80 durometer urethane. Conceivably the parts could also be made of dissimilar materials, for example, rubber, nylon, and urethane, and bonded together as an integral unit. Any of a number of plastics or rubbers, which exhibit the appropriate resilient tendencies, could be utilized to form the integral arm and blade element.

Locking means 70 are formed on the arm 66 toward the end opposite the blade 68. The locking means 70 consist of a generally circular section 72 and a narrower neck section 74 disposed within an opening 76 formed between the arm 66 and a head section 78. The head 78 is generally of rectangular configuration. A web 80 is shown connecting the blade 68 to the arm 66 and provides additional support against undue flexing of the arm with respect to the blade.

It is also contemplated that an arm could be formed having a hollow internal chamber capable of being fitted with different inserts to change the spring rate or flexibility of the arm. The insert (not shown) could be either metallic or non-metallic.

As can readily be seen, the locking means 70 is arranged to be connected to the connectors 38 of the support shaft 34 so that the circular section 72 lies within the circular section 42 and the neck section 74 lies within the glove section 40. Such an arrangement releasably locks the arm and blade to the shaft 34 and prevents linear movement of the arm and blade along the support member and holds the blade in position for cleaning the conveyor belt. A reversal of elements so as to make the male connector formed on the support and the female locking means formed on the arm is also considered within the scope of the present invention.

Since the arm and blade unit is flexible, it is able to absorb shock due to impact throughout the unit rather than at specific flexible connections, as, for example, the spring arrangement in prior art torsion arm cleaners. This advantage allows the construction of a support frame of lighter, non-metallic materials, such as fiberglass. This, in turn, results in a totally corrosion resistant belt cleaner with no corrosion-prone sub-parts such as fasteners. The constant flexing also helps prevent build-up on the arms and blades.

The operation of the arm and blade cleaner is as follows. Since the arm 66 and the blade 68 are both formed of a resilient, elastomeric material, such a construction allows the blade to rotate about the central axis of the arm in a limited fashion so as to insure proper alignment between the blade and the belt being cleaned. If, for any reason, there is some initial misalignment between belt and blade when the shaft is rotated to exert force, the blade will inherently align itself with the belt due to the resilient nature of both the arm and the blade and their connection with each other.

Figure 3:
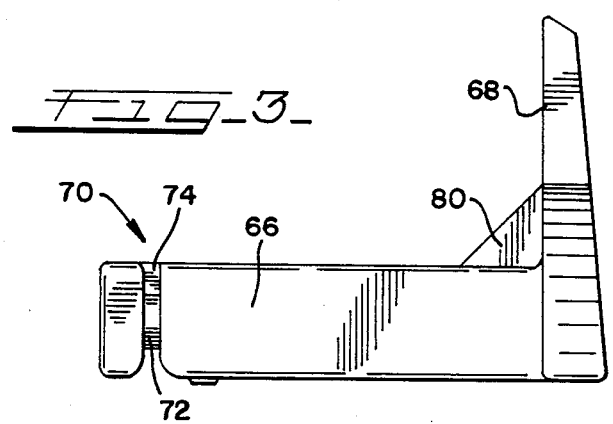
FIG. 3 is a side view of the arm and blade embodiment of the present invention removed from the transverse support member.

An additional advantage is found in the arm and blade embodiment. When the arms 66 are connected to the flange 36, the shaft 34 is then rotated by the handle, as shown in FIG. 1, to secure contact between the blade and the return run 24. As shown in FIG. 3, the blade 68 is disposed generally perpendicular to the central axis of the belt 24. Depending upon the particular environment in which the belt cleaner is designed to operate, this arrangement may be varied so that the blade 68 can assume a 90° angle with respect to the belt, as shown in FIG. 3, or an acute angle or an obtuse angle depending upon the desired arrangement. The shaft can, however, be incrementally adjusted to vary the angle with increasing rotation resulting in a general increase in the angle between the blade and the belt. If, for example, the initial angle between blade and belt is an acute angle, additional rotation of the shaft can change the angle from acute to perpendicular, with further rotation resulting in a change in the angle from perpendicular to obtuse. The same result would follow if the support were arranged for vertical adjustment. The ability to effect such incremental adjustment of the angle between the blade and the arm is of great advantage.

The present arrangement provides a conveyor belt cleaner with sufficient flexibility so as to prevent damage to the belt from the cleaner blade due to reversing belt operation, over-wear, over-adjustment, or sparking. It also provides an arrangement which utilizes non-metallic cleaner blades which offer greater safety if, for some reason, the blade fails or becomes disconnected and falls into the product stream.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A conveyor belt cleaning arrangement consisting of a linear support member disposed transverse to the direction of conveyor belt travel, connector means associated with said support member, one or more cleaner units, each unit including an arm formed of resilient elastomeric material defining a generally linearly extending central axis, said arm being resiliently rotatable about its central axis, each arm including locking means disposed at one end adapted to matingly engage with said connector means on said support member to removably secure said arm to said support member, each cleaner unit also including a blade member, also formed of resilient elastomeric material, attached to said arm, whereby when said locking means on said arm is engaged with said connector means, said arm extends from said support member and supports and positions said blade, such that when said blade is moved into engagement against said conveyor belt, the resilient elastomeric construction of said arm and said blade allow said blade to resiliently rotate about the central axis of said arm to accommodate variations in belt angles and to automatically align with the surface of the belt being cleaned, said resilient elastomeric construction of said arm and said blade being further effective to substantially reduce or eliminate vibration of said blade with respect to said belt while maintaining contact between said blade and belt.

2. A conveyor belt cleaning arrangement as in claim 1 in which said arm formed of resilient material is both resiliently rotatable about and deflectable continuously along its linearly extending central axis.

3. A conveyor belt cleaning arrangement as in claim 1 in which said blade lies in a plane which is substantially perpendicular to said linearly extending central axis of said arm when said arm and blade unit is in an unstressed condition, but which angle is variable due to the resilient elastomeric construction of said arm and blade when said blade is urged into contact with said belt to be cleaned.

4. A conveyor belt cleaning arrangement as in claim 1 in which said connector means consist of a flange extending radially outwardly from said support member defining a plurality of slots formed in said flange.

5. A conveyor belt cleaning arrangement as in claim 4 in which said locking means on said arm consist of a groove formed around the periphery of said arm to receive said flange and a neck section on said arm radially inwardly of said groove adapted to be snap-fit into said slot formed in said flange.

6. A conveyor belt cleaning arrangement as in claim 1 in which said arm and blade cleaner unit is formed as an integral element.

7. A conveyor belt cleaning arrangement as in claim 1 including a scraping element associated with said blade and adapted to contact the surface of the conveyor belt to be cleaned.

* * * * *

REEXAMINATION CERTIFICATE (1537th)
United States Patent [19]
Swinderman

[11] B1 4,643,293
[45] Certificate Issued Aug. 27, 1991

[54] CONVEYOR BELT CLEANER

[75] Inventor: Robert T. Swinderman, Kewanee, Ill.

[73] Assignee: Martin Engineering Company

Reexamination Request:
No. 90/001,949, Mar. 1, 1990
No. 90/002,120, Aug. 29, 1990

Reexamination Certificate for:
Patent No.: 4,643,293
Issued: Feb. 17, 1987
Appl. No.: 830,275
Filed: Feb. 18, 1986

Related U.S. Application Data

[62] Division of Ser. No. 579,707, Feb. 13, 1984, Pat. No. 4,598,823.

[51] Int. Cl.⁵ .............................................. B65G 45/00
[52] U.S. Cl. ....................................................... 198/497
[58] Field of Search .................. 198/497, 499; 15/245, 15/256.5

[56] References Cited
U.S. PATENT DOCUMENTS
3,841,470 10/1974 Meguro .
4,202,437 5/1980 Gordon .
4,533,036 8/1985 Gordon .

Primary Examiner—D. Glenn Dayoan
Attorney, Agent, or Firm—Dennis M. McWilliams; Jeffrey R. Gray

[57] ABSTRACT

A conveyor belt cleaning arrangement consisting of a transversely disposed support which includes a plurality of connector slots. One or more elastomeric cleaner blades, either of the arm and blade type, include a locking means to releasably connect the blade to the support without the use of fasteners and secure the blade against lateral motion and hold the blade in position for cleaning the belt.

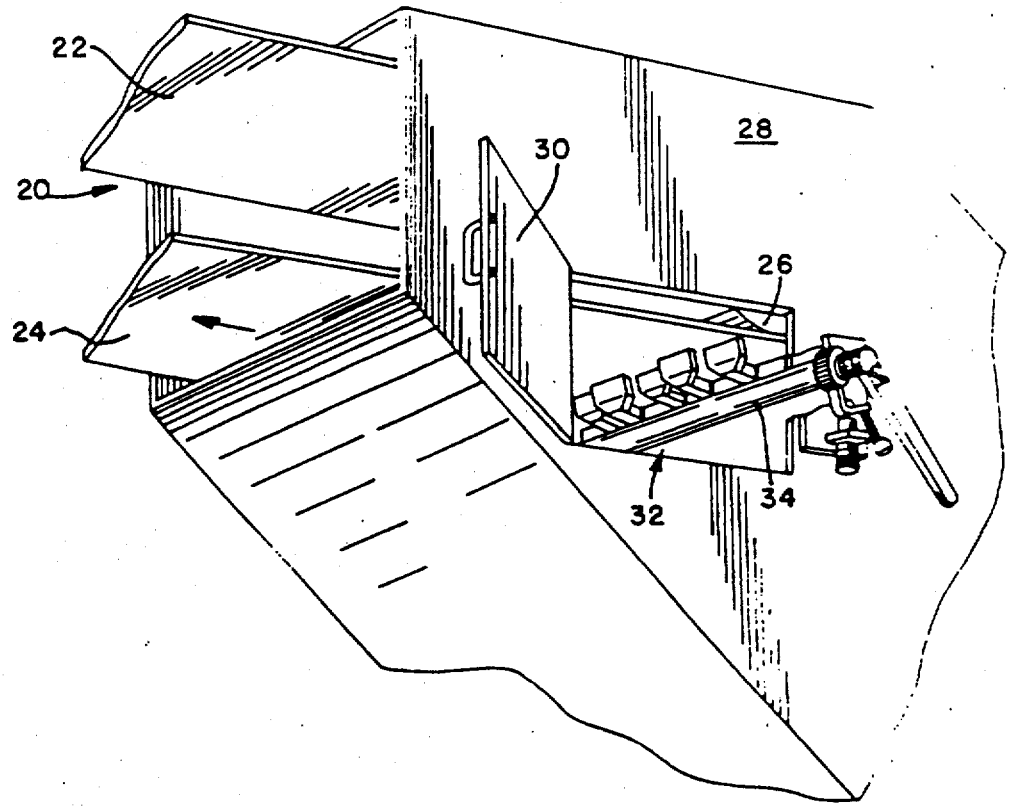

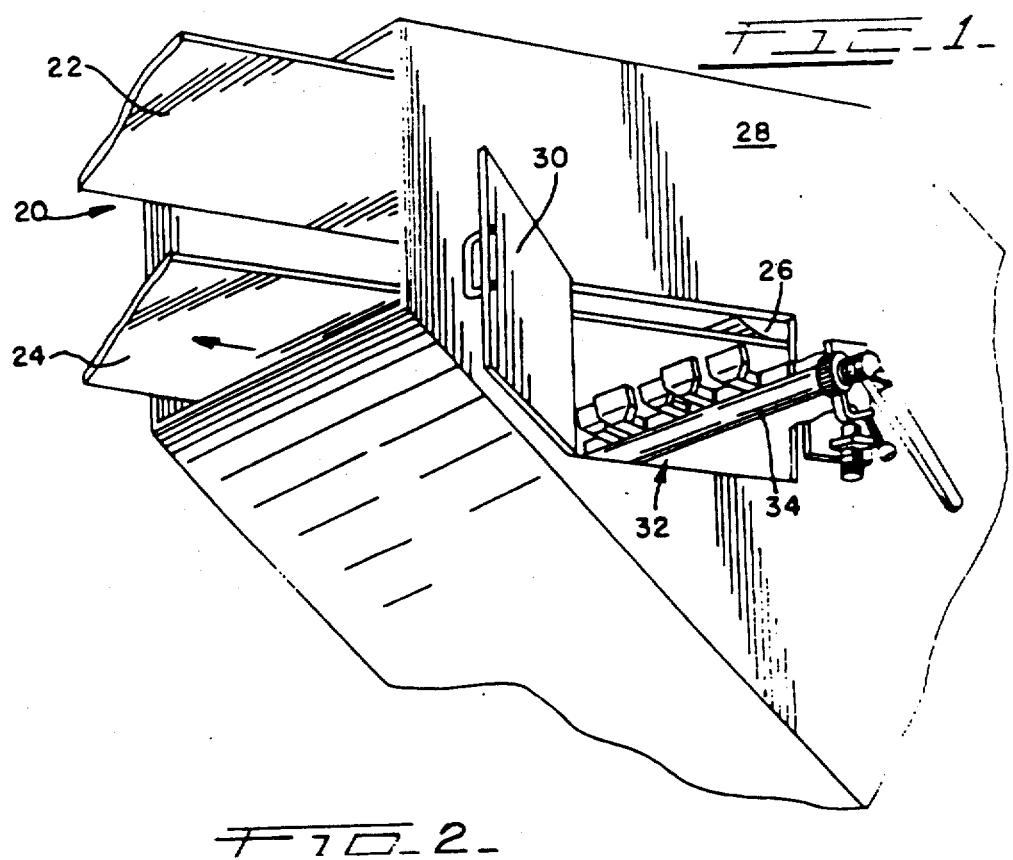

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *